United States Patent
Chen

(12) United States Patent (10) Patent No.: US 6,802,407 B1
Chen (45) Date of Patent: Oct. 12, 2004

(54) ADJUSTABLE FRONT SUSPENSION DEVICE

(76) Inventor: Hui-Hsiung Chen, No. 34, Chia-Hou Rd., Liu-Feng Tsuen, Waipu Hsiang, Taichung Hsien (TW)

( * ) Notice: Subject to any disclaimer, the term of this patent is extended or adjusted under 35 U.S.C. 154(b) by 0 days.

(21) Appl. No.: 10/411,303

(22) Filed: Apr. 11, 2003

(51) Int. Cl.$^7$ .............................................. B62K 25/08
(52) U.S. Cl. ............................ 188/319.2; 188/319.1; 188/322.13; 188/282.8; 280/276
(58) Field of Search ............................. 188/266.1, 281, 188/282.8, 282.9, 299.1, 285, 300, 313, 319.1, 319.2, 322.13; 280/276, 283

(56) References Cited

U.S. PATENT DOCUMENTS

| | | | | |
|---|---|---|---|---|
| 5,634,653 A | * | 6/1997 | Browning | 280/276 |
| 6,120,049 A | * | 9/2000 | Gonzalez et al. | 280/276 |
| 6,343,807 B1 | * | 2/2002 | Rathbun | 280/276 |

* cited by examiner

Primary Examiner—Douglas C. Butler
Assistant Examiner—Bradley King
(74) Attorney, Agent, or Firm—Rosenberg, Klein & Lee

(57) ABSTRACT

A front suspension device includes an inner tube fixedly connected to the crown portion of the front fork and movably inserted in an outer tube. A valve member is received in the inner tube and connected to a sleeve which extends from the inner tube and an adjusting member is connected to the sleeve and the outer tube. An end cap is fixed to the first end of the inner tube and connected to a hollow tube which is mounted by a ring member engaged with an inner periphery of the inner tube. A spring is mounted to the hollow tube. A core is movably received in the hollow tube and has a first end connected to an adjusting switch. A head is connected to the second end of the core and movably seals paths defined through the ring member. The spring is not compressed when the paths are sealed by the head. When a large pressure is applied to the head, the ring member is moved upward to compress the spring to re-activate the suspension device.

5 Claims, 9 Drawing Sheets

ADJUSTABLE FRONT SUSPENSION DEVICE

FIELD OF THE INVENTION

The present invention relates to front suspension device that can be locked when the bike goes uphill and an adjustment feature allows the suspension device reactivated when a sudden and large impact is applied to the front wheel.

BACKGROUND OF THE INVENTION

A conventional bicycle front suspension device "A" is disclosed in FIG. 8 and generally includes an inner tube 21 connected to a crown portion 10 of the front fork and an outer tube 22 in which the inner tube 21 is movably received. A spring is received in the inner tube 21 and stopped by a valve member 25 received in a lower end of the inner tube 21. An end of a sleeve 26 is connected to the valve member 25 and the other end of the sleeve 26 is connected to an adjusting member 27 which is fixed to the outer tube 22. The spring reacts promptly when the front wheel is ridden on a rough road so that the rider does not feel comfortable because the spring immediately releases the energy absorbed. In order to improve the shortcoming, the user may operate the adjusting member 27 to allow some liquid flows out from the sleeve 26 to reduce the speed of the spring that releases the energy. Nevertheless, when the bicycle goes uphill, the front suspension device becomes one of the sources of the resistant force for the rider. The sink of the front suspension device increases a component force that the rider has to overcome.

The present invention intends to provide a front suspension device that can be locked when the bicycle goes uphill and the situation can be unlocked automatically when a large impact is applied to the suspension device.

SUMMARY OF THE INVENTION

In accordance with one aspect of the present invention, there is provided a front suspension device which comprises an inner tube having a first end connected to a crown portion of a front fork and a second end of the inner tube is movably inserted in an outer tube. A valve member is received in the inner tube and a first end of a sleeve is connected to the valve member. An adjusting member is connected a second end of the sleeve which extends from the inner tube and the adjusting member is fixed to the outer tube.

An end cap is fixedly connected to the first end of the inner tube and a first end of a hollow tube is connected to the end cap and received in the inner tube. A sealing ring is movably connected to a second end of the hollow tube and engaged with an inner periphery of the inner tube. A spring is mounted to the tube and in contact between the end cap and the sealing ring. A plurality of paths are defined through the sealing ring.

A core is movably received in a passage of the hollow tube and a first end of the core is connected to an adjusting switch which is rotatably connected to the end cap. A head is connected to a second end of the core and movably seals the paths.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Figure 1:
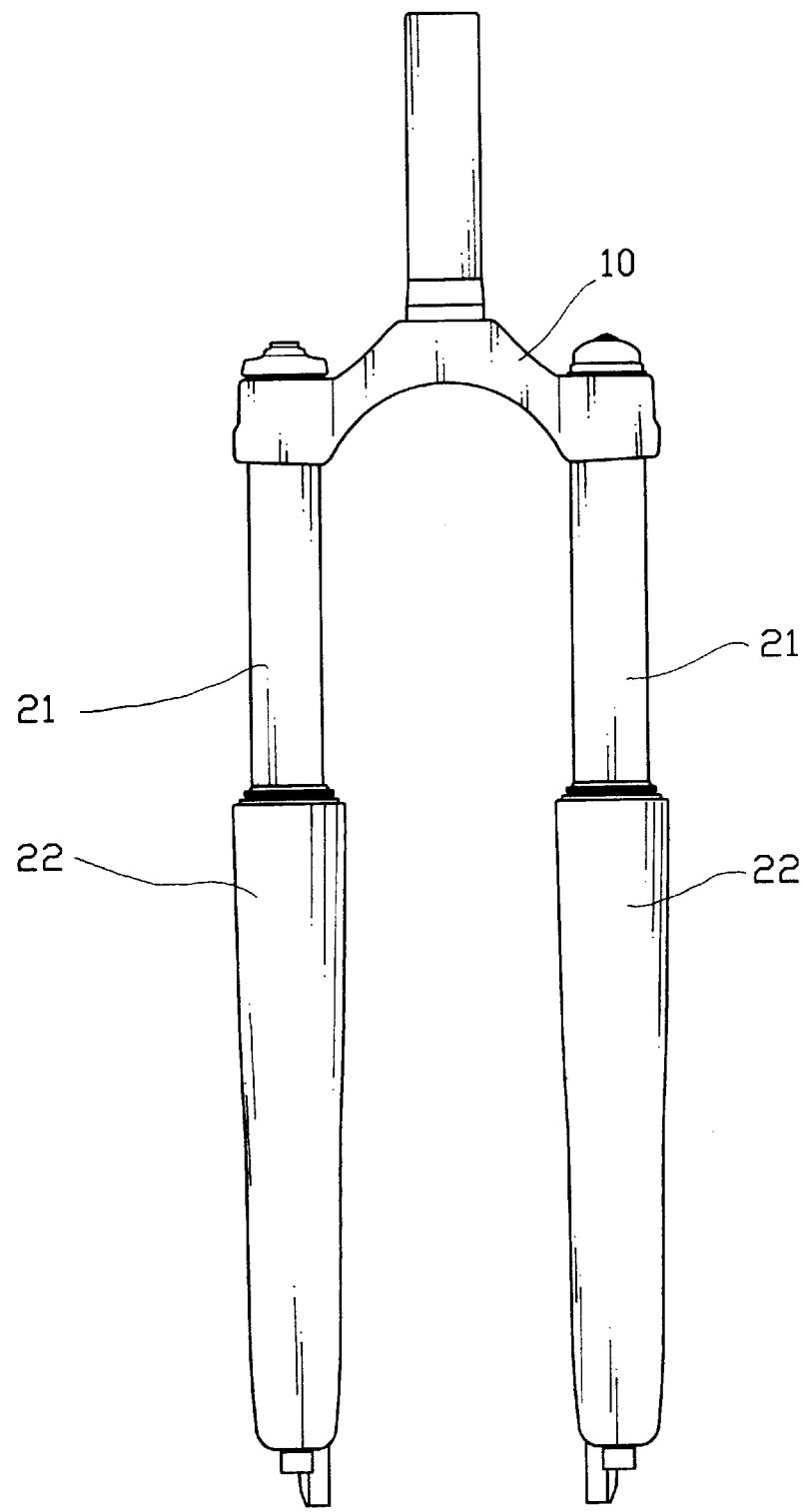
FIG. 1 shows the front suspension device connected to the front fork of a bicycle.
Figure 2:
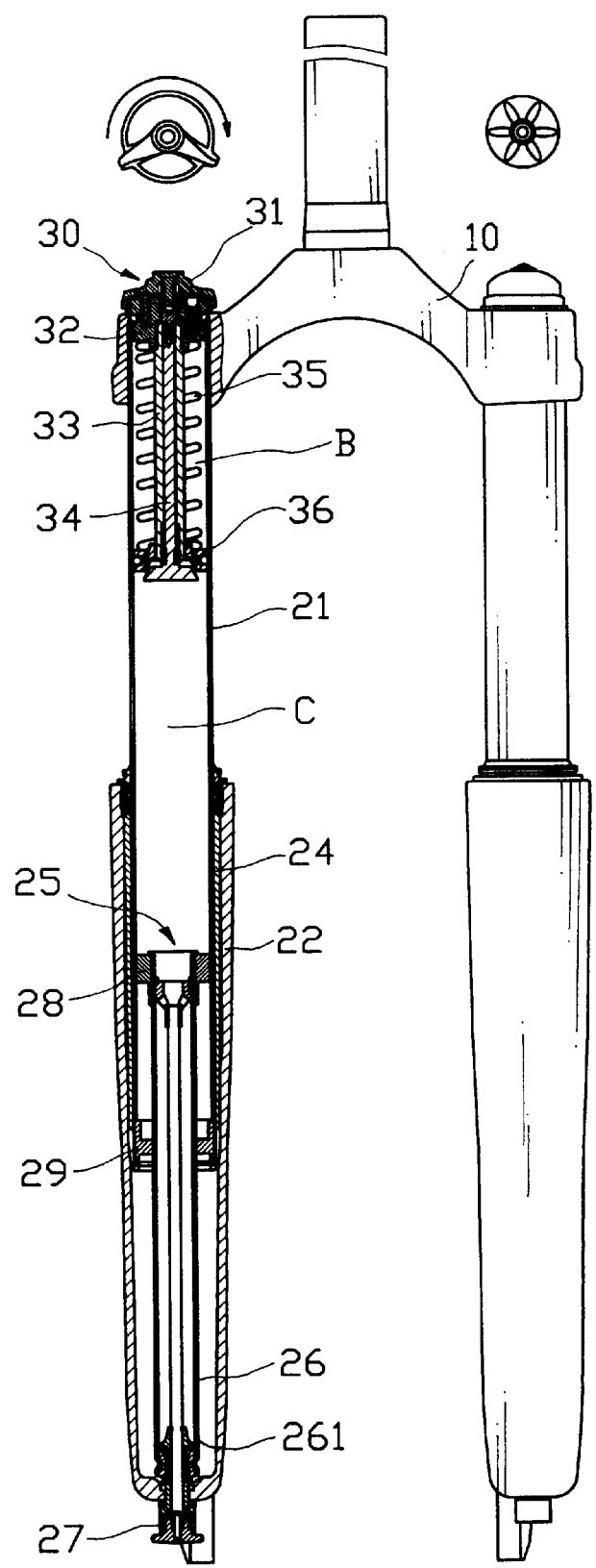
FIG. 2 is a cross sectional view to show the front suspension device of the present invention.
Figure 3:
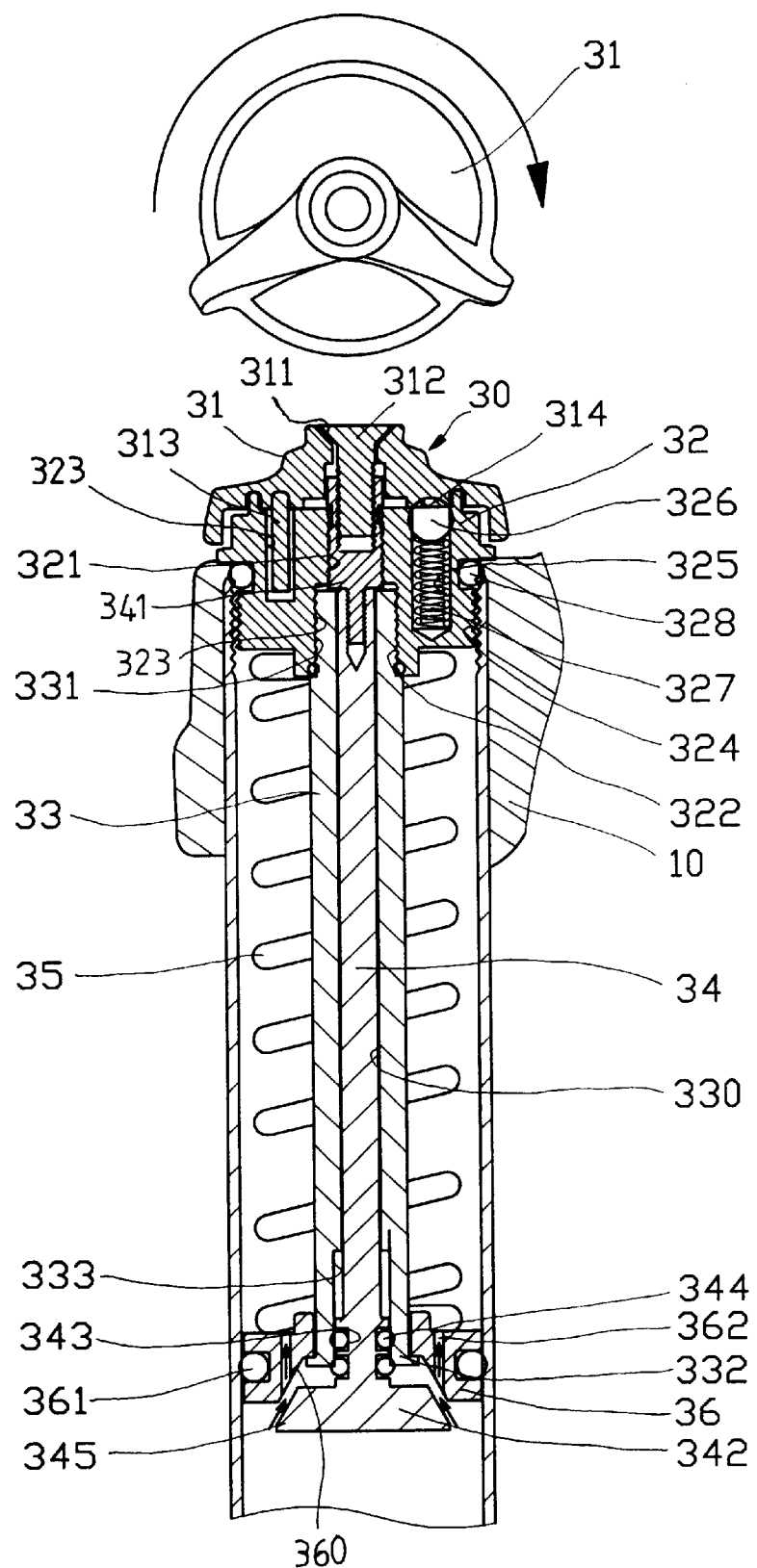
FIG. 3 is a cross sectional view to show the hollow tube connected between the end cap and the ring member in the inner tube.

Referring to FIGS. 1 to 3, the front suspension device of the present invention comprises an inner tube 21 having a first end connected to a crown portion 10 of a front fork and a second end of the inner tube 21 IS movably inserted in an outer tube 22. A sleeve 24 is located between the inner tube 21 and the outer tube 22. A valve member 25 is received in the inner tube 21 and includes a ring 28 which is engaged with an inner periphery of the inner tube 21 and a first end of a sleeve 26 is connected to the valve member 25. An adjusting member 27 is connected a second end of the sleeve 26 and the second end of the sleeve 26 extends through a sealing member 29 received in the second end of the inner tube 21 and the adjusting member 27 is fixed to the outer tube 22.

An adjusting device 30 includes an end cap 32 which has an outer threaded section 324 which is threadedly connected to a threaded section defined in the inner periphery of the first end of the inner tube 21 with a seal ring 328 mounted to the end cap 32. A first end of a hollow tube 33 has an outer threaded section 331 which is threadedly connected to a recessed threaded section 323 of the end cap 32. The hollow tube 33 is received in the inner tube 21 and has a passage 330 defined therethrough. A sealing ring 36 is movably mounted to a second end of the hollow tube 33 and engaged with the inner periphery of the inner tube 21 by the O-ring 361. A plurality of paths 362 are defined through the ring member 36 so that the chamber "B" between the end cap 32 and the ring member 36 communicates with the chamber "C" between the valve member 25 and the ring member 36. A spring 35 is mounted to the hollow tube 33 and in contact between the end cap 32 and the sealing ring 36.

A core 34 is movably received in a passage 330 of the hollow tube 33 and a first end of the core 34 is connected to an adjusting switch 31 which is rotatably connected to the end cap 32. A head 342 having a tapered periphery 345 is connected to a second end of the core 34 and movably engaged with a tapered recess 360 defined in an underside of the ring member 36 so as to seal the paths 362. The hollow tube 33 has an enlarged area 333 defined in an inner periphery of the passage 330 and the core 34 has two annular grooves 343 in which seals 344 are engaged, the seals 344 engaged with an inner periphery of the enlarged area 333.

The adjusting switch 31 has a central piece 312 extending through a central hole 311 defined in the adjusting switch 31 and a connection piece 341 is threadedly connected to the central piece 312 in a threaded hole 321 in the end cap 32 and connected to the first end of the core 34. A positioning concavity 323 is defined in a top of the end cap 32 and a positioning rod 313 extending from an underside of the adjusting switch 31 is inserted in the concavity 323. The end cap 32 further has a recess 325 defined in the top thereof and a spring 327 and a bead 326 are respectively received in the recess 325. A plurality of notches 314 are defined in an underside of the adjusting switch 31 and the bead 326 is engaged with one of the notches 314.

When the adjusting switch 31 is positioned at unlocked position as shown in FIG. 3, when the front wheel is ridden on a bump, the pressure pushes the ring member 36 upward so that oil in the chamber "B" can release from the paths 362 and the gap 345 between the head 342 and the inner periphery of the tapered recess 360 of the ring member 36.

Figure 4:
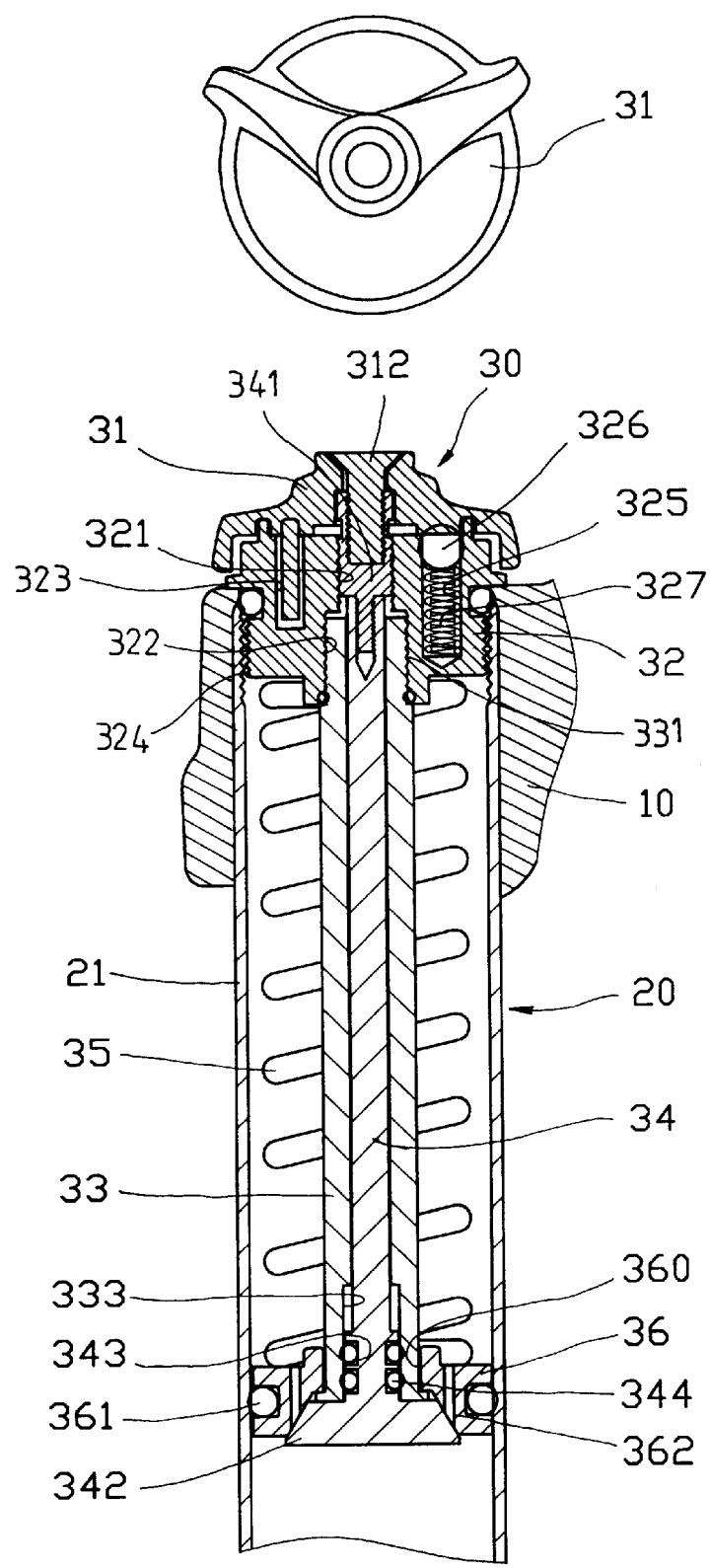
FIG. 4 is a cross sectional view to show the adjusting switch is rotated and the head connected to the core is lifted to seal the paths in the ring member.
Figure 4A:
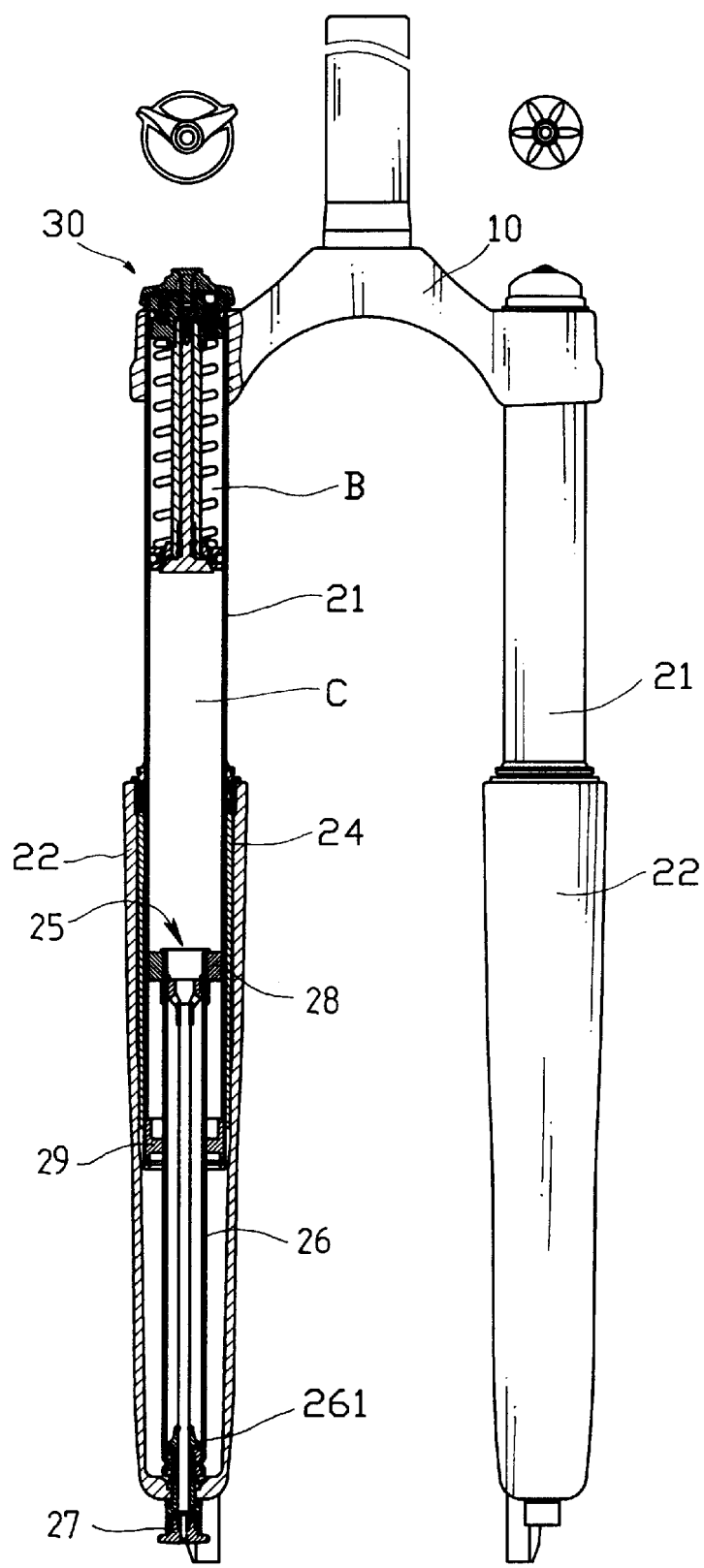
FIG. 4A shows the front suspension device is locked.
Figure 5:
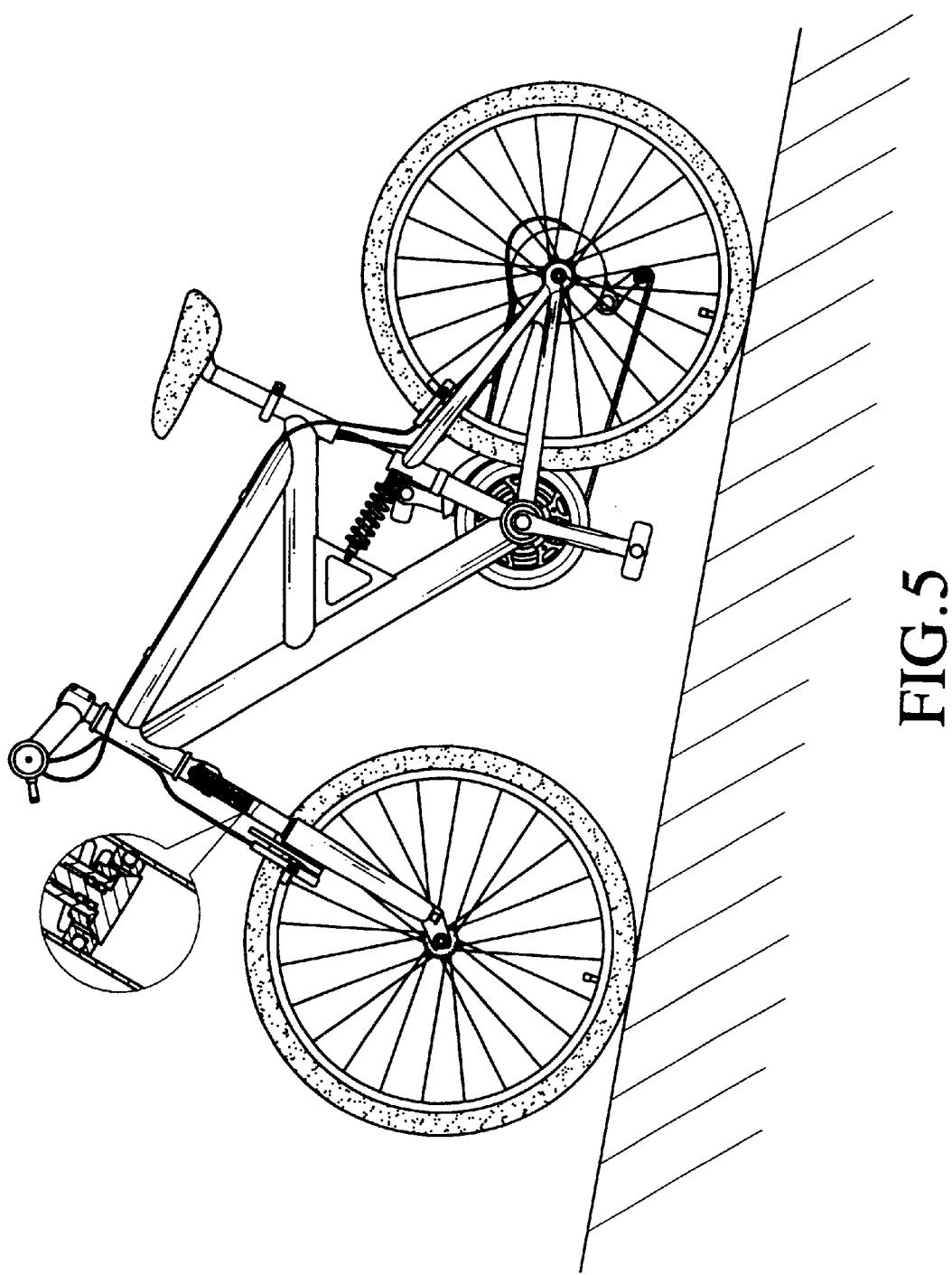
FIG. 5 shows the bicycle goes uphill while the front suspension device is locked.

Referring to FIGS. 4, 4A and 5, when rotating the adjusting switch 31 to locked position before the bicycle goes uphill, the core 34 is lifted and the head 32 seals the paths 362. The chamber "B" is isolated from the chamber "C" so that the oil in the chamber "B" becomes an incompressible solid part so that the suspension device does not work.

Figure 6:
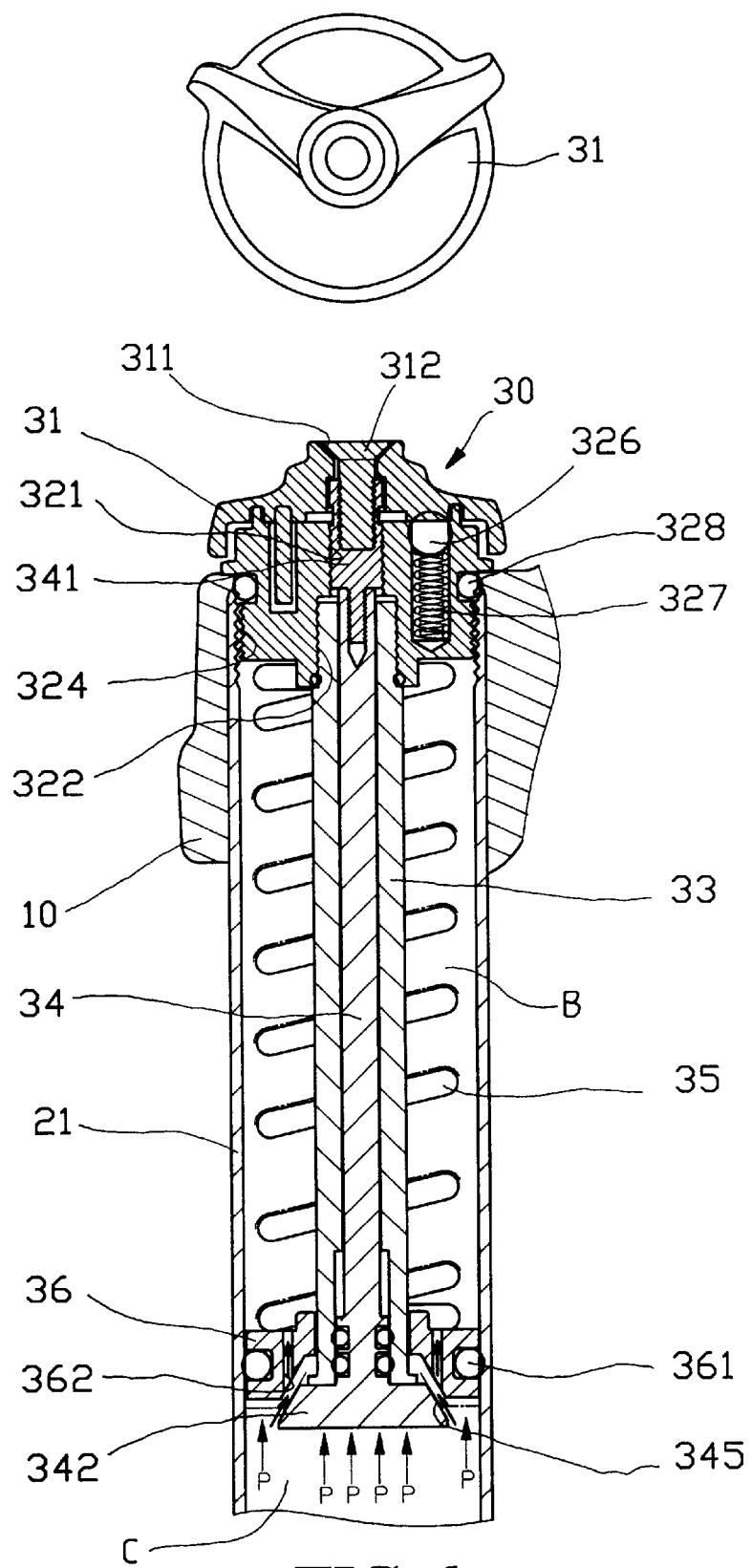
FIG. 6 shows a large pressure is applied to the head to push the ring member upward.
Figure 7:
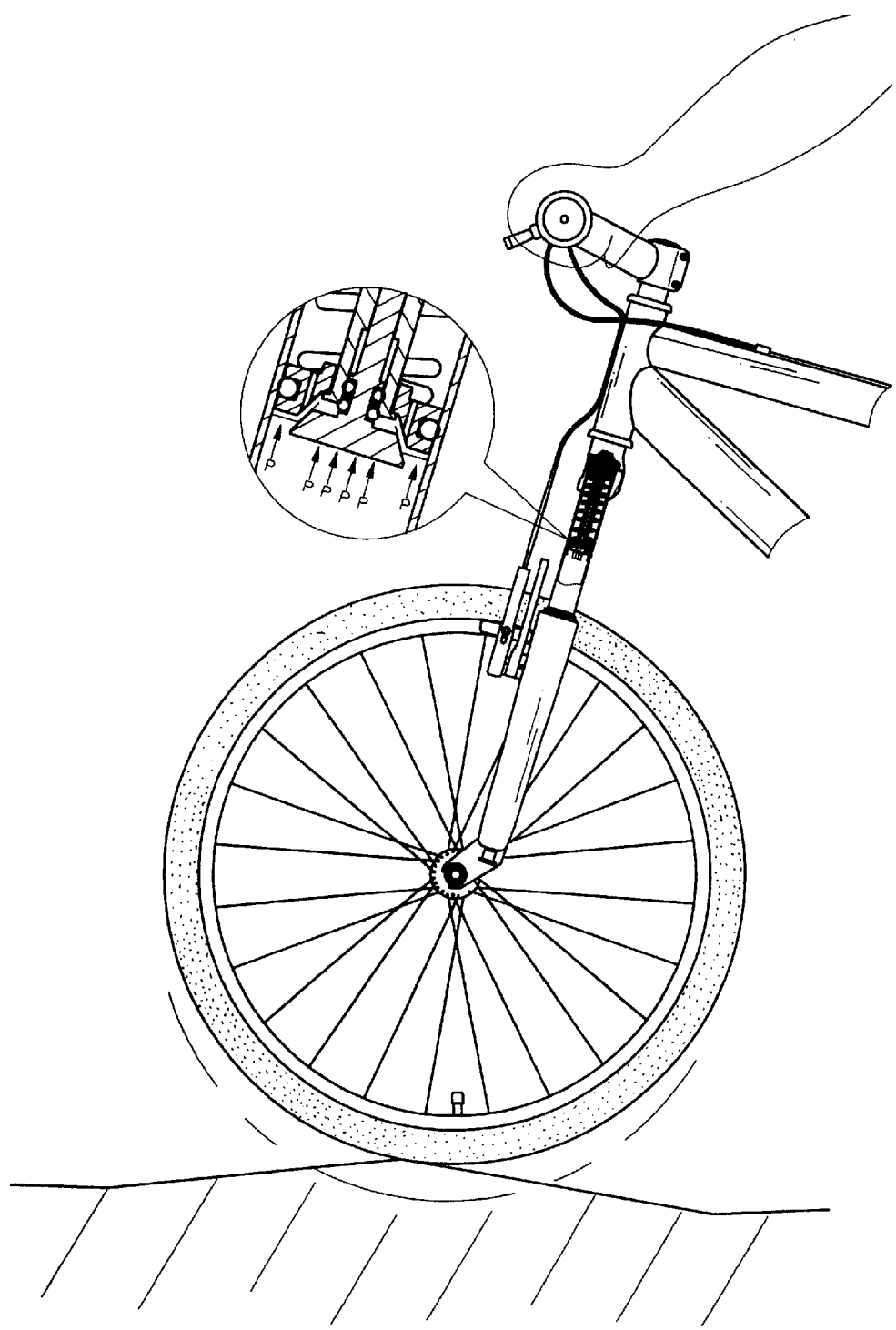
FIG. 7 shows the front suspension device is reactivated when a large pressure is applied to the head of the core.
Figure 8:
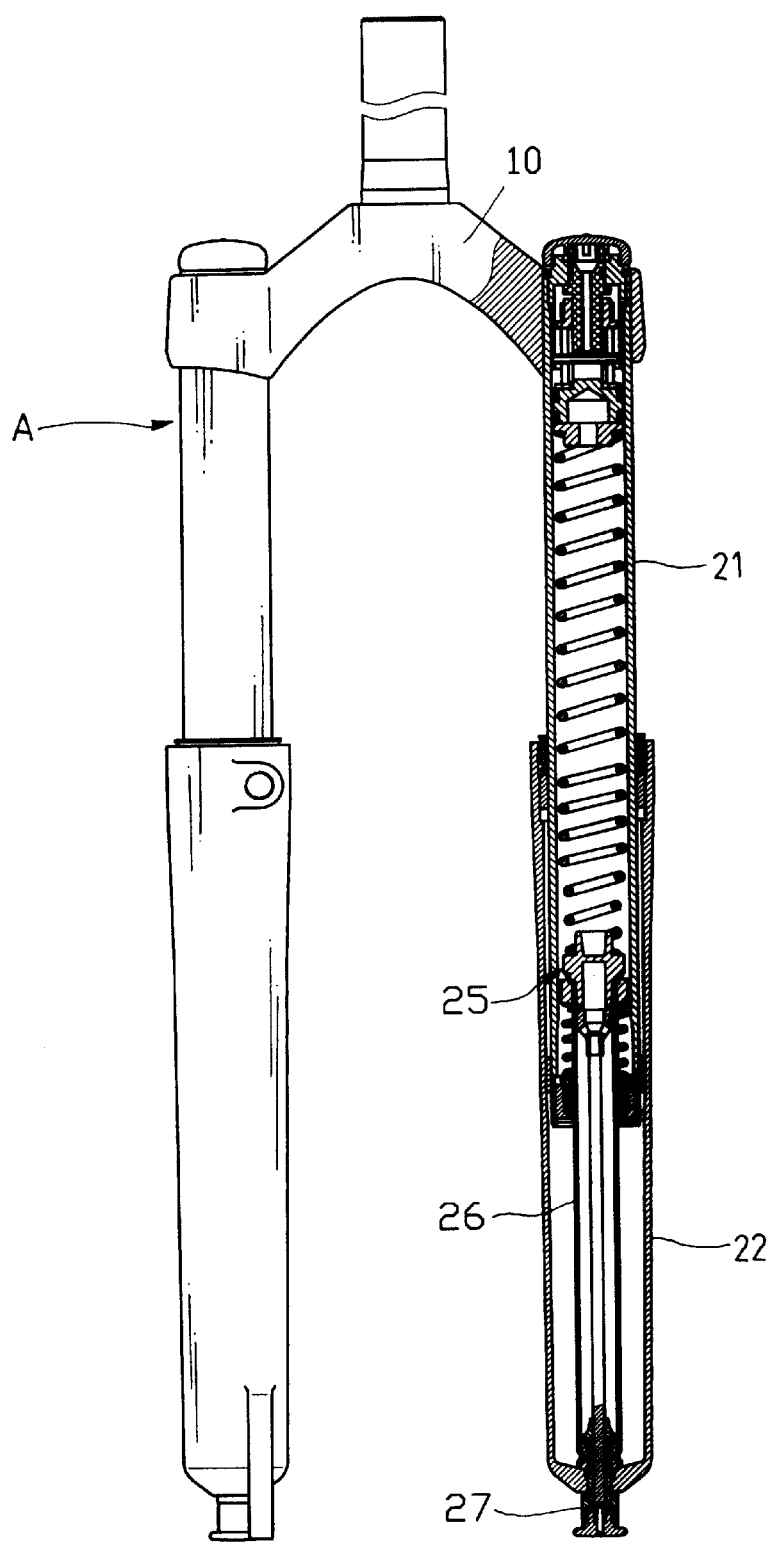
FIG. 8 shows a conventional front suspension device.

As shown in FIGS. 6 and 7, if the front wheel is ridden over a bump and oil in the chamber between the inner tube 21 and the outer tube 22 enters the holes 261 (FIG. 2) of the sleeve 26 so that a large pressure is applied to the head 342 and the ring member 36. This generates a force that is larger than the force of the spring 35, the ring member 36 is moved upward and the spring 35 is compressed. The paths 362 and the gap 345 are opened and the oil in the chamber "B" may release from the paths 362 and the gap 345. Therefore, when a large impact is happened to the front wheel, the front suspension device is re-activated again. After the wheel rolls over the bump, the spring 35 pushes the ring member 36 back to its original position and the paths 362 are sealed by the head 345 again.

While we have shown and described the embodiment in accordance with the present invention, it should be clear to those skilled in the art that further embodiments may be made without departing from the scope of the present invention.

What is claimed is:

1. A front suspension device comprising:

an inner tube having a first end connected to a crown portion of a front fork and a second end of the inner tube movably inserted in an outer tube, a valve member received in the inner tube and a first end of a sleeve connected to the valve member, an adjusting member connected a second end of the sleeve, the second end of the sleeve extending from the inner tube and the adjusting member fixed to the outer tube;

an end cap fixedly connected to the first end of the inner tube and a first end of a hollow tube connected to the end cap and received in the inner tube, a sealing ring movably connected to a second end of the hollow tube and engaged with an inner periphery of the inner tube, a spring mounted to the hollow tube and being in contact between the end cap and the sealing ring, a plurality of paths defined through the sealing ring, and a core movably received in a passage of the hollow tube and a first end of the core connected to an adjusting switch which is rotatably connected to the end cap, a head connected to a second end of the core and movably sealing the paths.

2. The device as claimed in claim 1, wherein the adjusting switch has a central piece extending therethrough and connected to the first end of the core.

3. The device as claimed in claim 1, wherein the end cap has a recess defined in a top thereof, and a spring and a bead are respectively received in the recess, a plurality of notches defined in an underside of the adjusting switch and the bead engaged with one of the notches.

4. The device as claimed in claim 1, wherein the head has an tapered periphery and the ring member has a tapered recess defined in an underside thereof so as to receive the head therein.

5. The device as claimed in claim 1, wherein the inner tube has a threaded section defined in an inner periphery of the first end thereof and the end cap has an outer threaded section which is threadedly connected to the threaded section of the first end of the inner tube.

* * * * *